United States Patent [19]
Fitts

[11] Patent Number: 5,400,031
[45] Date of Patent: Mar. 21, 1995

[54] AIRPORT SURFACE VEHICLE IDENTIFICATION SYSTEM AND METHOD

[75] Inventor: Richard A. Fitts, Monroe, Conn.

[73] Assignee: Norden Systems, Inc., Norwalk, Conn.

[21] Appl. No.: 207,332

[22] Filed: Mar. 7, 1994

[51] Int. Cl.⁶ ............................................. G01S 13/80
[52] U.S. Cl. ...................................... 342/36; 342/37
[58] Field of Search ...................... 342/24, 30, 32, 33, 342/34, 36, 37

[56] References Cited

U.S. PATENT DOCUMENTS

| | | | |
|---|---|---|---|
| Re. 32,368 | 3/1987 | Funatsu et al. | 342/45 |
| 3,152,327 | 10/1964 | Barker | 343/8 |
| 3,665,313 | 5/1972 | Trent | 325/55 |
| 3,697,941 | 10/1972 | Christ | 340/23 |
| 3,855,571 | 12/1974 | Massa | 340/26 |
| 3,872,474 | 3/1975 | Levine | 343/5 |
| 3,872,474 | 3/1975 | Levine | 343/5 |
| 3,900,846 | 8/1975 | Gibbon et al. | 343/6 |
| 4,197,536 | 4/1980 | Levine | 343/5 |
| 4,319,243 | 3/1982 | Vachenauer et al. | 343/6.5 |
| 4,454,510 | 6/1984 | Crow | 343/5 |
| 4,733,241 | 3/1988 | Litchford et al. | 342/453 |
| 4,819,174 | 4/1989 | Furuno et al. | 364/444 |
| 5,111,400 | 5/1992 | Yoder | 364/424.01 |
| 5,179,384 | 1/1993 | DeHaan | 342/37 |
| 5,200,902 | 4/1993 | Philley | 364/439 |
| 5,243,340 | 9/1993 | Norman et al. | 340/953 |
| 5,262,784 | 11/1993 | Drobnicki et al. | 342/45 |

FOREIGN PATENT DOCUMENTS 289657 11/1988 European Pat. Off. .

OTHER PUBLICATIONS

"Two Frequency Secondary Radar Incorporation Passive Transponders", Electronic Letters, 13th Dec. 1973, vol. 9, No. 25, pp. 592–593.

Lyon, Ervin F., "Airport Surface Traffic Automation", vol. 4, No. 2, 1991; The Lincoln Laboratory Journal; pp. 151–188.

Hollister, Walter M., "Airport Surface Traffic Automation Study", Technical Report; Department of Transportation, Washington, D.C. 20591; 9 May 1988; 55 pps.

Uzunoglu, Vasil & White, Marvin H.; "The Synchronous Oscillator: A Synchronization and Tracking Network"; IEEE Journal of Solid-State Circuits, vol. SC-20, No. 6, Dec. 1985; pp. 1214–1226.

Primary Examiner—Mark Hellner

[57] ABSTRACT

An airport vehicle identification system for improving airport traffic management and collision avoidance, includes a ground surveillance radar and a plurality of low power frequency translators located in spaced relationship about the surface of the airport. The radar system transmits a conventional radar signal for target detection and a beacon interrogation signal for target detection. Each translator is designed to bandshift the interrogation signal to a frequency value compatible with the vehicle transponder, and transmit the bandshifted interrogation signal to the vehicle transponder. Each frequency translator is bi-directional and receives a transponder reply signal indicative of vehicle identity and bandshifts the reply signal to a frequency value compatible with the ground surveillance radar and transmits the bandshifted reply signal to the ground radar. This invention fills the critical void in airport traffic control of providing ground controllers with electronic airport ground surveillance data which includes both vehicle position and identity.

17 Claims, 5 Drawing Sheets

AIRPORT SURFACE VEHICLE IDENTIFICATION SYSTEM AND METHOD

TECHNICAL FIELD

This invention relates to an airport ground traffic control radar system, and more particularly to a system for detecting, tracking and identifying vehicles on an airport surface to improve airport traffic management and collision avoidance.

BACKGROUND ART

Unauthorized incursions of aircraft and ground vehicles onto runways and taxiways can often have catastrophic results. The number of aircraft accidents that occur on the ground is nearly three times the number of aircraft accidents that occur in the air.

In degraded visual conditions the problem becomes even greater since the ground controller is often reliant on non-visual information such as voice communication from the cockpit crew reporting the aircraft's current position on the airport surface, or display information from a ground surveillance radar system. Unfortunately, only the largest airports in the United States have ground surveillance radar systems to aid the controller. The Federal Aviation Administration (FAA) is addressing this problem by installing ASDE-3 ground surveillance radars in twenty-nine U.S. airports and the FAA Training Academy. The remainder of the U.S. airports depend solely on the visual observations of the controller and position reports from pilots. The problem gets even worse. The majority of ground surveillance radar systems other than ASDE-3 are often over twenty-five years old, difficult to maintain, and provide ironically inadequate information in poor weather when radar is needed most. As a result, the controller in the tower is almost completely reliant on his visual observations and surface position reports from aircraft crews to provide situational awareness of the current state of the airport surface. In degraded visual conditions, the controller is literally often asking the question "where are you?" to aircraft crews to provide his situational awareness of the airport surface. As a result, the controller has to maintain a mental image of the airport surface, rather than having hard surveillance data available.

The current state of surface traffic control and several solutions to this problem are discussed in an article entitled "Airport Surface Traffic Automation" written by Ervin F. Lyon and published in The Lincoln Laboratory Journal, Volume 4, Number 2, 1991. The article discusses several alternatives such as the Airport Surface Traffic Automation (ASTA) plan of the Federal Aviation Administration, and the Airport Movement Area Safety System (AMASS) currently under development by Norden Systems, a subsidiary of the assignee of the present invention. AMASS operates in conjunction with the ASDE-3 ground surveillance radar which utilizes high resolution radar electronic surveillance data to provide tower controllers with all weather surface surveillance capability. AMASS processes the ASDE-3 data to detect and track airport ground traffic, predict where the ground traffic will be a fixed time later (e.g., 10 seconds), and alert controllers of possible runway incursions and ground collisions with sufficient time to allow corrective action to be taken. However, neither the AMASS nor the ASDE-3 currently include the ability to identify vehicles on the airport surface.

One proposed system for identifying (i.e., tagging) vehicles on the airport surface includes the use of a surface Mode-S beacon system having approximately "five to seven simple stationary antennas and associated electronics around the periphery of the airport". However, such a system is complex and expensive due to the need for several antennas and associated electronics placed about the surface of the airport. In addition, not all aircraft are required to be equipped with a Mode-S transponder. Furthermore, airport vehicles such as plows, catering trucks and tugs are not required to be equipped with any type of transponder.

In order to provide the advantages of vehicle identification to as many airports as possible, a lower cost identification system which can be integrated into existing systems is required to identify aircraft, thus improving airport traffic management and collision avoidance technology.

DISCLOSURE OF THE INVENTION

An object of the present invention is to provide airport ground situational awareness information to aircraft ground controllers, including tag information to identify a detected object.

Another object of the present invention is to automatically generate and display status information to airport ground controllers indicative of target identity and target position on airport runways, taxiways, and other critical airport ground traffic areas.

Yet another object of the present invention is to provide a system for identifying targets on an airport surface which does not require additional electronic aircraft equipment, or involve modifying current aircraft systems.

According to the present invention, an airport ground surveillance system capable of detecting and identifying vehicles on the surface of the airport includes a plurality of frequency translators spaced about the airport surface which receive an interrogation signal from the ground surveillance radar and bandshift the interrogation signal to a carrier frequency value compatible with the aircraft transponder, and retransmits the bandshifted interrogation signal to an aircraft transponder; in response to a valid bandshifted interrogation signal, the aircraft transponder transmits a reply signal indicative of the aircraft identity which is received by an adjacent frequency translator, the frequency translator bandshifts the reply signal to a carrier frequency signal value compatible with the ground surveillance radar and retransmits the bandshifted response signal to the ground surveillance radar.

The present invention provides air traffic controllers with situational awareness data indicative of vehicle position on the airport surface, and the identity of each detected vehicle on the airport surface. Aircraft, tugs, plows and other vehicles which typically operate on the surface of an airport (thus creating a potential for collision with an aircraft) can be equipped with a transponder to provide target identity information to the ground surveillance radar system.

An advantage of the present invention is the addition of airport surface vehicle identification capability it provides without requiring additional aircraft equipment. Therefore, this invention can be implemented without cost to airline or other aircraft operators.

The present invention is premised on the fact that all commercial aircraft are required to have a secondary surveillance radar (SSR) transponder which is interrogated by in-route radar systems and responds with a unique identification signal. In a preferred embodiment, the present invention utilizes the SSR transponder while the aircraft is on the ground to provide a reply signal indicative of the aircraft identity in response to an interrogation from the airport ground surveillance radar. A plurality of frequency translators located about the airport surface, translate the ground surveillance radar interrogation signal to a bandshifted interrogation signal compatible with the aircraft transponder. Each frequency translator also translates the transponder's reply signal to a signal compatible with the ground surveillance radar.

The present invention can be used with any of the well known Mode A, C and S secondary surveillance radar transponders. In addition, the present invention can be incorporated into any ground surveillance radar system which requires vehicle identification information.

These and other objects, features and advantages of the present invention will become more apparent in light of the following detailed description of a preferred embodiment thereof, as illustrated in the accompanying drawings.

BEST MODE FOR CARRYING OUT THE PRESENT INVENTION

Figure 1:
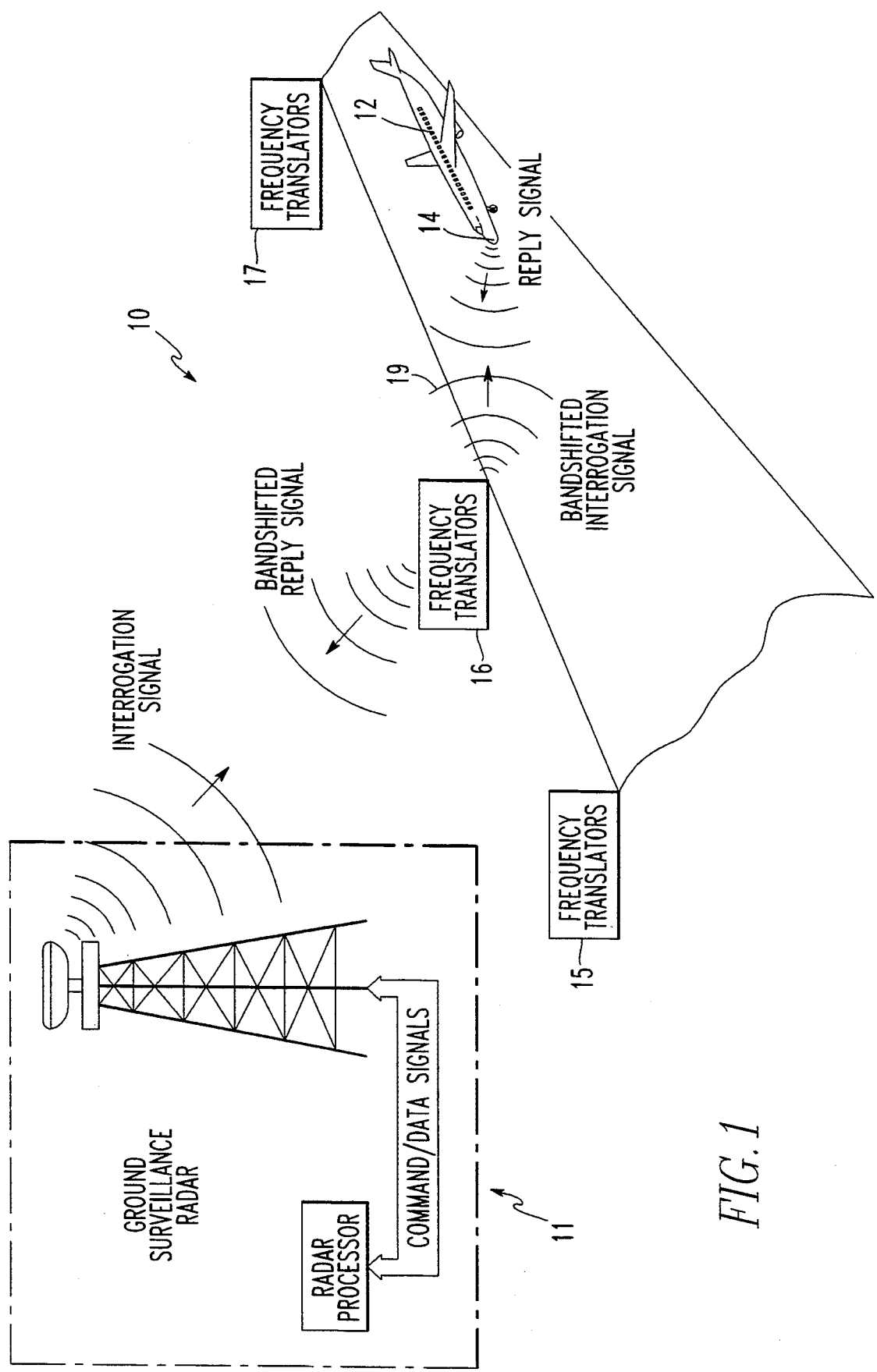
FIG. 1 is an illustration of the operational environment of the present invention.

Referring to FIG. 1, the operational environment of the airport surface vehicle identification system of the present invention is the surface of an airport 10. The airport includes a ground surveillance radar system 11 which detects, tracks, and identifies vehicles (e.g., aircraft, trucks and cars) on the airport surface. An example of a ground surveillance radar system is the ASDE-3 radar system produced by Norden Systems, Inc. The ASDE-3 displays all vehicles that can be detected by primary surface radar out to about four nautical miles in range and up to approximately two hundred feet above ground level.

The system 10 also includes a plurality of frequency translators 15-17 spaced about the airport surface which receive the interrogation signal from the ground surveillance radar 11 and bandshift the interrogation signal to a carrier frequency value $f_t$ compatible with the aircraft transponder 14. The frequency translator then retransmits a low power bandshifted interrogation signal 19 to vehicles (e.g., an aircraft 12) on the airport surface in close proximity to the frequency translator. In response to a valid bandshifted interrogation signal, an aircraft transponder 14 transmits a reply signal indicative of the aircraft identity which is received by an adjacent frequency translator. The adjacent frequency translator bandshifts the reply signal to a carrier frequency signal value $f_1$ compatible with the ground surveillance radar 11 and retransmits a low power bandshifted reply signal to the ground surveillance radar 11.

Figure 2:
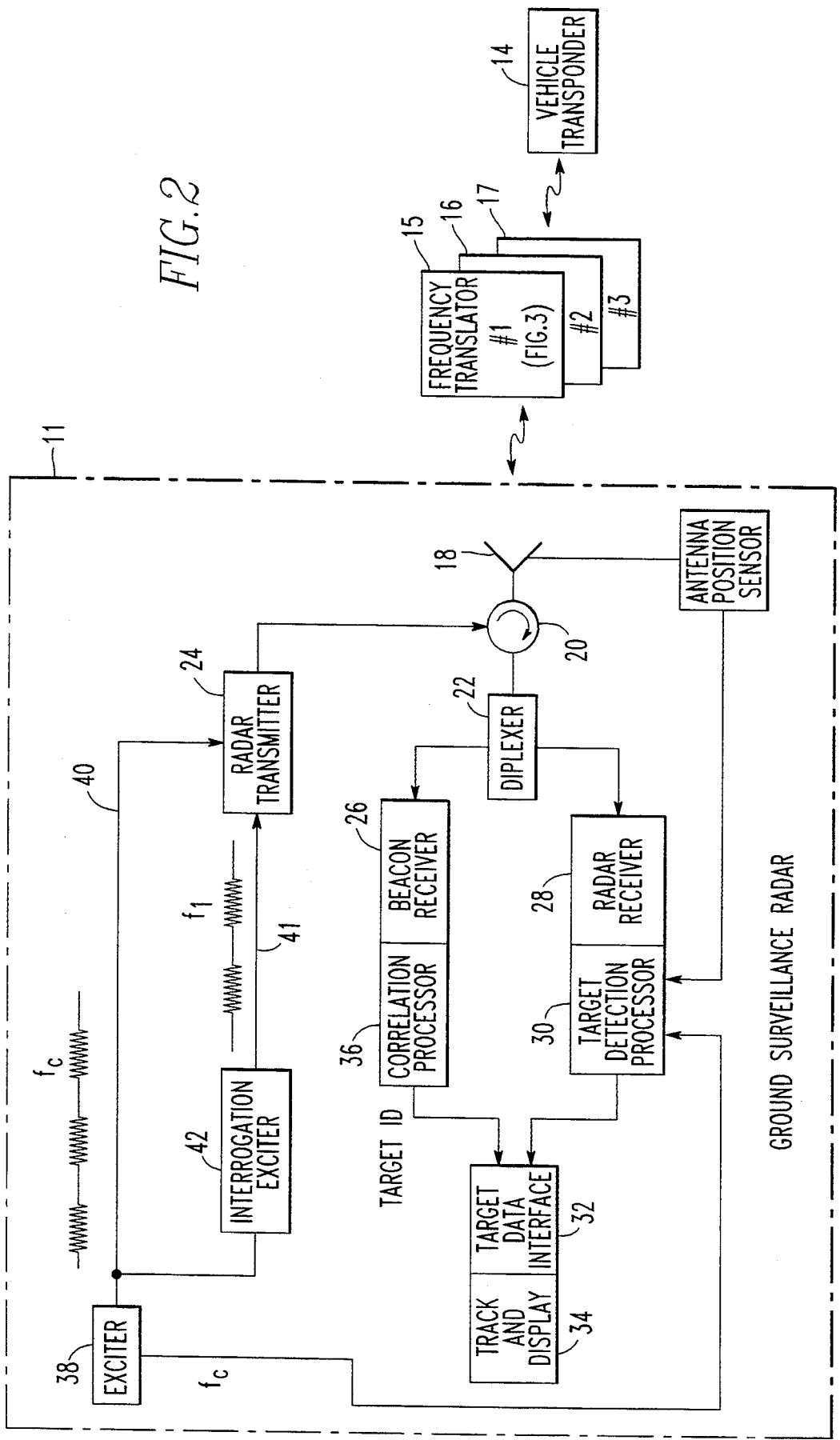
FIG. 2 is an functional block diagram of the present invention.

Referring to FIG. 2, the airport surface vehicle identification system (hereinafter the "system") includes three primary components: the ground surveillance radar 11, the plurality of frequency translators 15-17, and the vehicle mounted transponder 14. The ground surveillance radar 11 is preferably a pulsed frequency agile radar system that includes an antenna 18 which receives signals from and provides data to a circulator 20. The circulator 20 routes a received signal to a diplexer 22 and receives a transmit signal from a radar transmitter 24. The diplexer 22 routes the received signal from the circulator 20 to both a beacon receiver 26 and a radar receiver 28. The beacon receiver 26 is tuned to receive data indicative of the vehicle's identity from the frequency translators 15-17, while the radar receiver 28 is tuned to receive a reflected vehicle skin return signal indicative of the vehicle's position on the surface of the airport. Beacon receiver 26 includes a linear electronic interface, while the radar receiver 28 is typically a log receiver with automatic gain control based upon clutter, range, etc. The radar receiver 28 provides a signal to a radar target detection processor 30 containing advanced digital signal processing algorithms to detect a target against clutter while providing an operationally acceptable false alarm rate. The processing algorithms may contain correlation filters, Kalman filters, clutter maps and other known radar processing tools. The target detection processor 30 provides real time data indicative of the position of the detected targets to a target data interface 32 which operates in conjunction with a track and display unit 34. The beacon receiver 26 is tuned to receive signals retransmitted by the frequency translator 16. The received signal is amplified, filtered and down converted to an IF frequency by the beacon receiver 26 then routed to a correlation processor 36.

The ground radar 11 also includes an exciter 38 which supplies a pulsed RF signal having a carrier frequency value $f_c$ on a line 40. Typical carrier frequencies $f_c$ are about 15.7–17.7 GHz (Ku band) with a pulse repetition frequency (PRF) of about 16 KHz. An interrogation exciter 42 generates and provides a pulsed RF interrogation signal on a line 41 having a carrier frequency of $f_1$ also within the Ku band which is then amplified by the radar transmitter 24 and radiated by the antenna 18. The pulsed RF signal on the line 40 and the pulsed RF interrogation signal on the line 41 are multiplexed and amplified by the transmitter 24 (e.g., a TWT) which provides a amplified RF signal to the antenna 18 which radiates the signals into free space. While the present invention is described in connection with the Ku band, one skilled in the art will appreciate that the invention is not necessarily so limited and that any band L through Ka may be used. However, surface detection radars generally operate at either X or Ku band, and Ku band is preferred since the ASDE system currently operates within the Ku band.

To determine the identity of the vehicle, the correlation processor 36 demodulates and decodes the digital phase shift keyed (DPSK) encoded reply signal provided by the vehicle transponder 14. The vehicle transponder 14 reply signal can utilize either a Mode A,C or S secondary surveillance radar (SSR) encoded message format since all three message formats contain vehicle identification information. To reduce the probability of more than one transponder replying to a bandshifted interrogation signal, the antenna 18 should radiate a narrow beamwidth and the physical distribution of the frequency translators 15–17 on the airport surface should be such that only one frequency translator is illuminated at a time by the ground surveillance radar 11. Transponders may also use a pseudo-random delay time before replying to a valid interrogation signal to further reduce the probability of collision with other vehicle reply signals. In the simplest embodiment, the position of the vehicle is determined by the target detection processor 30 using the position of the radar antenna 18 to determine azimuth position, and the round trip time of the pulsed RF signal from the antenna 18 to the vehicle. However, the ground surveillance radar 11 may also use data fusion technology to determine the vehicle position from both the radar data and encoded position information within the transponder's reply signal. Thus, an advantage of the present invention is realized by the automatic integration of vehicle position data with data indicative of the vehicle's identity such as its registration number or flight number.

Figure 3:
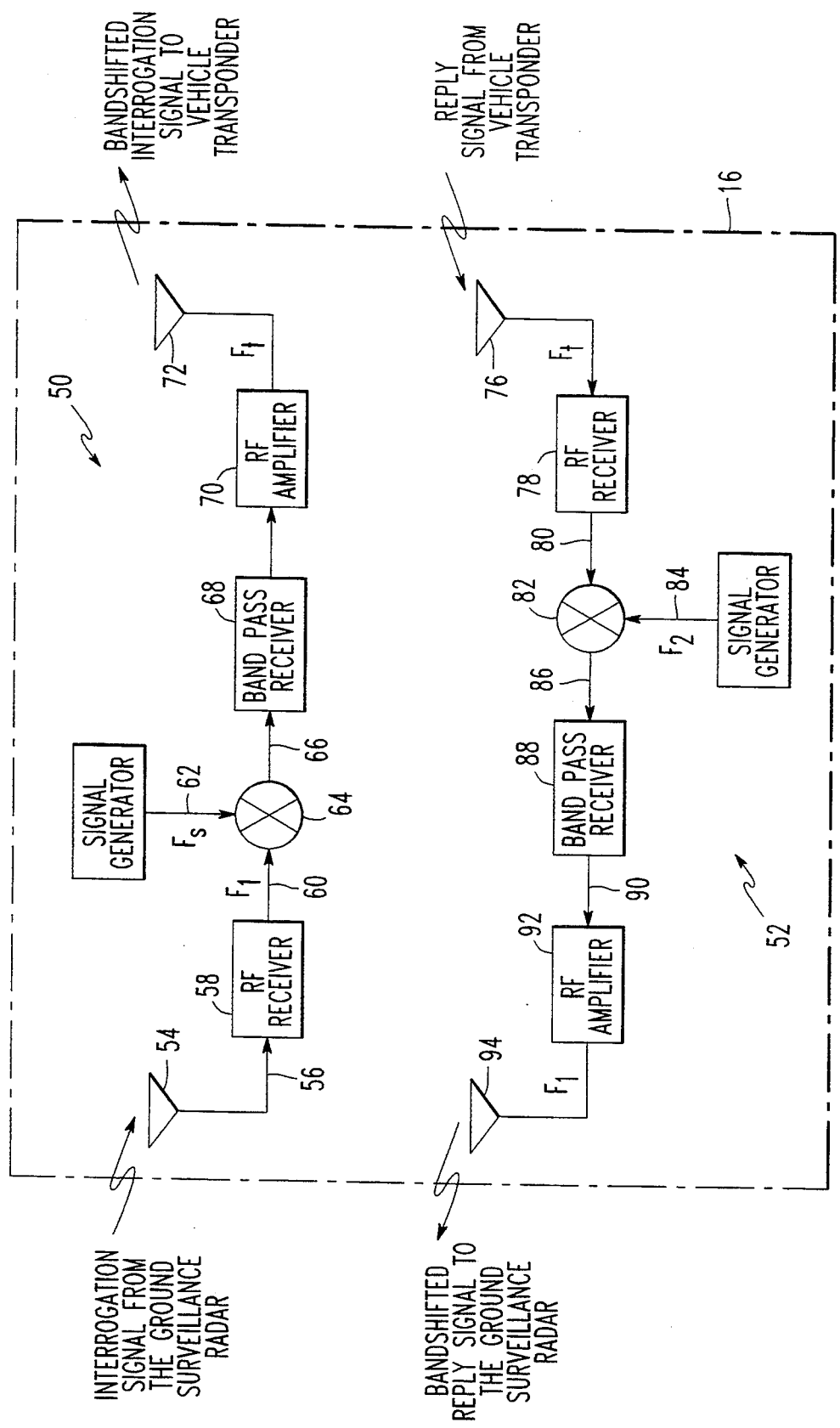
FIG. 3 is a functional block diagram of a frequency translator.

Referring to FIG. 3, each frequency translator 15–17 includes a radar receive channel 50 and an aircraft transponder receive channel 52. The radar receive channel 50 includes an antenna 54 which receives the interrogation signal from the ground surveillance radar 11 and provides a signal on a line 56 to an RF receiver 58. The receiver 58 provides a received interrogation signal on a line 60 which is mixed with a frequency shifting signal (e.g., sine or cosine waveform) on a line 62 having a frequency value $f_s$. A mixer 64 provides a mixed signal on a line 66 containing a difference spectrum and a sum spectrum. Attention is drawn to the fact that the frequency value $f_s$ is selected such that the spectrum of the difference frequency components created by mixing (i.e., beating the two signals) has a carrier frequency signal value $f_t$ which is compatible with the vehicle transponder 14. The mixed signal on the line 66 is then input to a bandpass filter 68 which attenuates the frequency components associated with the spectrum of the sum frequency components. If the transponder 14 operates at frequency values compatible with current SSR systems, the bandpass filter 68 should have a passband of about ±20 MHz centered at approximately 1030 MHz. An RF amplifier 70 then amplifiers the bandpassed signal which is radiated by an antenna 72. The beam shape provided by antenna 72 is selected to radiate the interrogation signal within a specified area in close proximity to frequency translator 16. Use of a shaped antenna pattern provided by the antenna 72 and controlling the amplitude of the radiated interrogation signal ensures only transponders within the specified coverage area of frequency translator 16 respond to interrogations.

The aircraft transponder receive channel 52 receives the reply signal from the aircraft transponder 14 and translates the reply signal to frequency value $f_1$ which is compatible with the ground surveillance radar 11. The transponder receive channel 52 includes a receive antenna 76 which captures the reply signal from the aircraft and provides a captured reply signal to an RF receiver 78. The receiver 78 provides a signal on line 80 to a mixer 82 which mixes the signal with a bandshift signal on a line 84. The bandshift signal is either a sine or cosine waveform having a frequency value $f_2$. The frequency value $f_2$ is selected to bandshift the reply signal to a frequency value (e.g., Ku band) compatible with the ground surveillance radar 11. The mixer 82 provides a mixed signal on the line 86 that is input to a bandpass filter (BPF) 88. The BPF 88 passes the difference signal spectrum of the mixed signal and provides a signal indicative thereof on a line 90 to an RF amplifier 92. The power of the amplifier 92 should be adequate to transmit the signal to the ground surveillance radar 11 up to about five miles away. The amplifier 92 provides a signal to a transmit antenna 94 which radiates the signal to the ground surveillance radar 11. Note, the use of multiple response antennas 76 and channels 52 may be used to improve the position resolution capabilities of the system.

Figure 4:
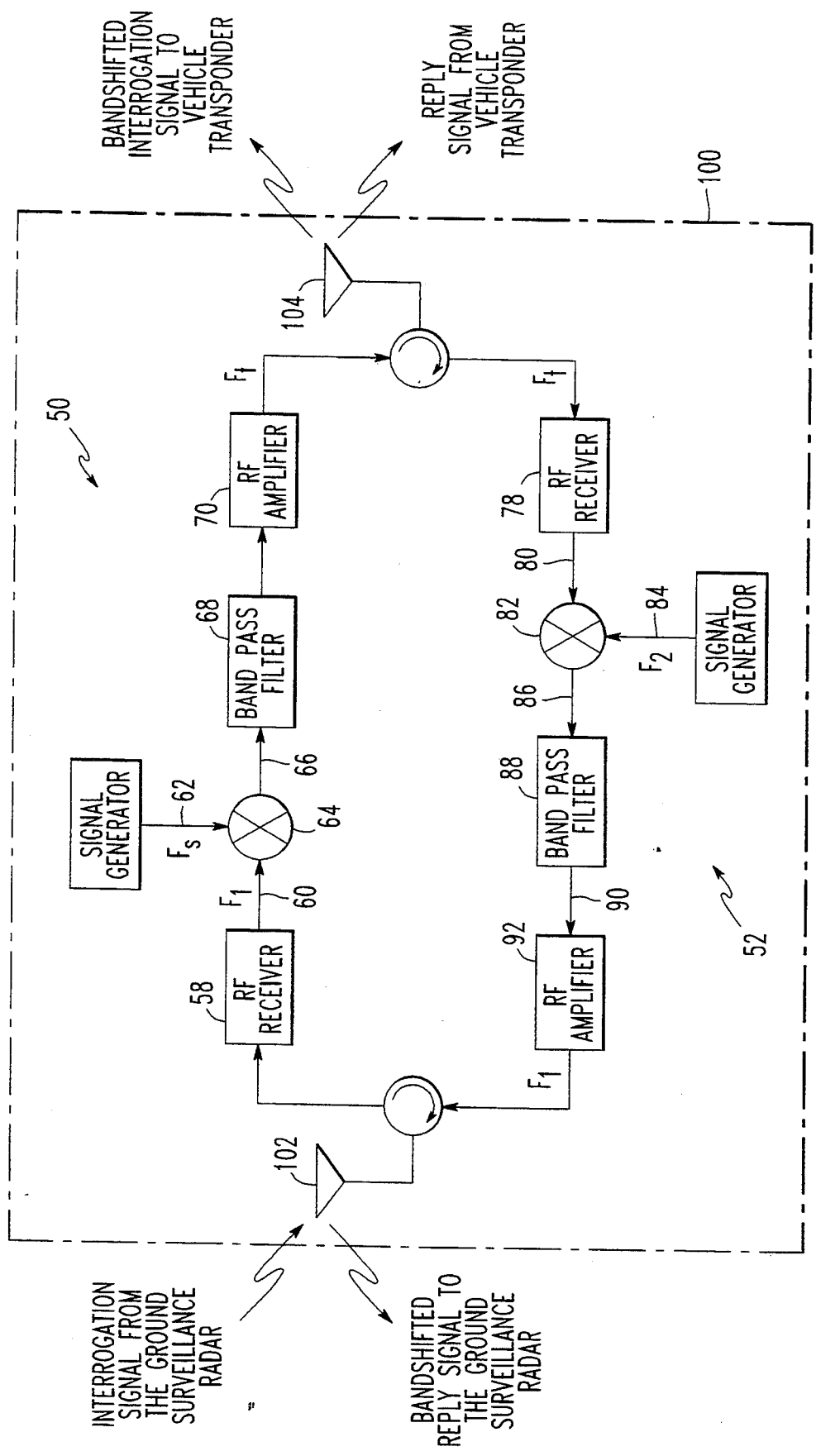
FIG. 4 illustrates an alternative embodiment frequency translator employing a common receive and transmit antenna.

FIG. 4 illustrates an alternative embodiment frequency translator 100 employing a common transmit and receive antenna. The embodiment illustrated in FIG. 4 has elements that are essentially the same as the elements illustrated in FIG. 3 and therefore the numerical designations remain the same wherever possible. The primary difference with the alternative embodiment frequency translator 100 illustrated in FIG. 4 is the use of common receive/transmit antennas 102,104.

Figure 5:
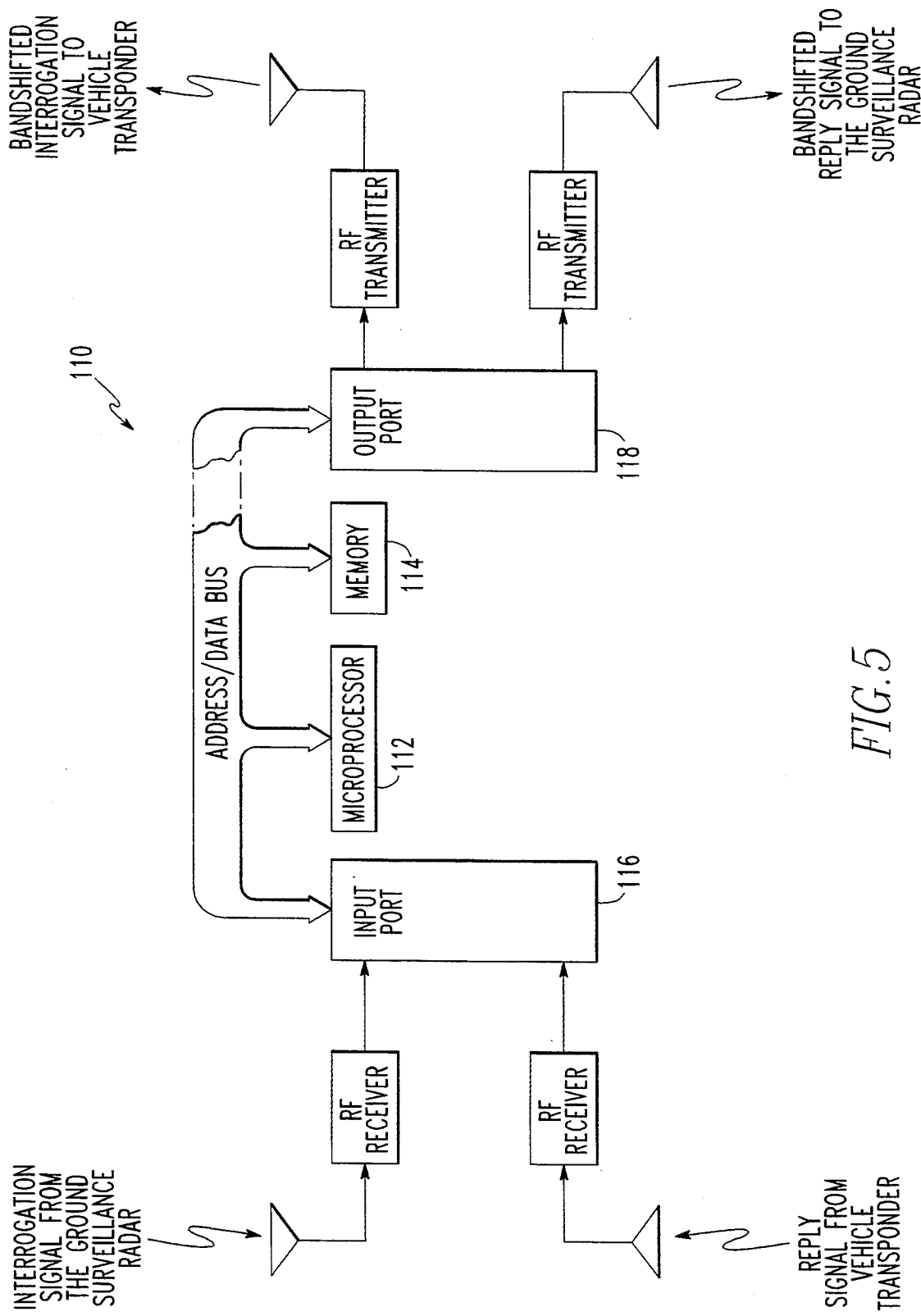
FIG. 5 illustrates a functional block diagram of a discrete time embodiment of a frequency translator.

The preferred frequency translator embodiment is a continuous time domain embodiment (i.e., an analog unit) due to its simplicity and relatively low cost. However, as an alternative embodiment, the signal processing of the present invention may be performed in the discrete time domain due to the inherent advantages of digital signal processing over analog processing and the additional system design flexibility. FIG. 5 illustrates a functional block diagram of a discrete time/microprocessor based frequency translator unit 110 which includes a microprocessor 112 (e.g., Intel 80486, Motorola 68030 or a RISC processor such as the Texas Instruments TMSC325), memory 114 ( e.g., RAM, PROM, EEPROM) and input/output ports 116,118 respectively. The microprocessor 112 should have sufficient processing speed to handle real-time data processing. Depending on the input signal characteristics, the input ports 116 may include an analog-to-digital converter, a frequency-to-digital converter, or any such other signal conditioning functions known to those skilled in the art as being required to transform input signals to digital signal format. Similarly the output port 118 will include any such signal processing functions required to transform digital signal to a format compatible with the systems which utilize the information from the receivers.

While the present invention has been described with respect to the embodiments illustrated herein, and in particular the frequency translator embodiments, one of ordinary skill in the art will certainly appreciate that the invention is clearly not so limited and that in fact the frequency translator can be any translator capable of interfacing with a ground surveillance radar and vehicle transponders. As an example, the invention is not limited to working with only SSR Mode A,C or S transponders. Nor is the present invention limited to working with only the family of ASDE radars. It is contemplated that the system of the present invention may be employed in any number of ground radar/transponder configurations which require the frequency translator of the present invention to facilitate providing vehicle ID information to the ground radar. The values of the radar PRF, bandpass filter passband and center frequency are merely examples of appropriate system values and clearly design dependent.

One of ordinary skill will certainly appreciate that additional circuitry may be added to the frequency translators illustrated herein to allow for more signal conditioning/processing, increased fault tolerance, improved maintainability or any other criteria used by systems designers in designing a system. In addition, built-in-test circuitry and monitoring logic may be added to ensure that a detectable failure in any of the frequency translators is reported to a central monitoring station so the faulty translator can be replaced.

The present invention is clearly not limited to transponders which employ DPSK modulation; any suitable well known modulation technique for encoding an RF signal can be used to provide the data to the ground surveillance radar system 11. The present invention is certainly not limited to the detection and identification of only aircraft, the present invention may also be used to detect other targets such as trucks, cars, plows or other vehicles operating on the airport surface. While a pulsed radar system is the preferred embodiment, the present invention is also applicable to a continuous wave (CW) radar. In addition, although a rotating ground radar antenna 18 is preferred due to cost, one could use an 360 degree electronically scanned array antenna. Incidentally, it will be appreciated there are many ways for the transponder to encode the ID data in the reply signal. The ID can be phase modulated, amplitude modulated or any other well known way of encoding information in an RF signal.

The ground surveillance radar system is not limited to illuminating only a single frequency translator with each transmitted interrogation signal. To improve the detectable vehicle position resolution of the system, at each frequency translator site a pair of frequency translators can be placed a certain relatively close distance to one another (e.g., 20 feet), rather than just a single frequency translator per site. In response to an interrogation Signal, only one of the frequency translators would transmit a bandshifted interrogation signal. The other frequency translator would operate in a hot standby mode ready to take over if the other translator was no longer able to transmit the bandshifted interrogation signal properly. On the reply side, both frequency translators would actively operate, but at different frequencies since the surveillance radar has frequency agility (e.g., 16 channels). This would allow both translators to transmit a bandshifted reply signal back to the ground surveillance radar. To accommodate this embodiment, the ground surveillance radar would include a second aircraft transponder receive channel similar to receive channel 52 (FIG. 3). The second channel would be tuned to receive the bandshifted reply signal from the second frequency translator at the site, thus providing additional information which can be used by a signal processor to improve the detectable vehicle position resolution on the airport surface. This embodiment also increases the fault tolerance of the system since a failure of a single frequency translator will not cause a site to go down since the other frequency translator is still operating.

All the foregoing changes and variations are irrelevant to the present invention, it suffices that an airport vehicle identification system includes a low power frequency translators located in spaced relationship about the surface of the airport for translating the airport ground surveillance radar interrogation signal into a signal compatible with the aircraft transponder. The frequency translator also translates the aircraft reply signal to a signal compatible with the ground surveillance radar receiver.

The present invention fills the critical void in airport traffic management and collision avoidance by providing ground controllers with electronic airport ground surveillance data which includes both vehicle position and identity.

Although the present invention has been shown and described with respect to a preferred embodiment thereof, it should be understood by those skilled in the art that various other changes, omissions, and additions may be made to the embodiments disclosed herein, without departing from the spirit and Scope of the present invention.

I claim:

1. An airport vehicle identification system for detecting and identifying vehicles on the surface of an airport, comprising:
   a ground surveillance radar which multiplexes and radiates both i) a conventional radar signal for detecting vehicles on the surface of the airport and ii) a beacon interrogation signal having a carrier signal frequency value $f_1$, and which receives both a reflected skin return signal from a detected vehicle indicative of the vehicle's position and an encoded ID signal indicative of the vehicle's identity; and
   a frequency translator located on the surface of the airport, including
      a first channel including means for receiving said beacon interrogation signal, means for bandshifting said beacon interrogation signal to a carrier frequency value $f_t$ and for providing a bandshifted interrogation signal, and means for transmitting said bandshifted interrogation signal; and
      a second channel including means for receiving an identification reply signal from a vehicle, means for bandshifting said identification reply signal to frequency value $f_1$ and for providing a bandshifted reply signal indicative thereof, and means for transmitting said encoded ID signal to said ground surveillance radar.

2. The airport vehicle identification system of claim 1 wherein said ground surveillance radar includes a radar transmitter which provides a first series of RF pulses at carrier frequency $f_c$ and a second series of RF pulses at carrier frequency $f_1$ wherein said first series of RF pulses is used to detect the vehicle while said beacon interrogation signal includes said second series of RF pulses.

3. The airport vehicle identification system of claim 1 wherein said first channel comprises
   a signal generator which provides a first mixing signal having a frequency value $f_s$; and
   a first mixer which mixes said first mixing signal and said interrogation signal to provide said bandshifted interrogation signal.

4. The airport vehicle identification system of claim 3 wherein said second channel comprises
   a signal generator which provides a second mixing signal having a frequency value $f_2$; and
   a second mixer which mixes said second mixing signal and said identification reply signal to provide said bandshifted identification reply signal.

5. The airport vehicle identification system of claim 4 wherein said ground surveillance radar comprises
   a beacon receiver which processes said encoded ID signal and provides a decoded ID signal indicative of vehicle identity;

a radar receiver for processing said reflected skin return signal to determine the position of the vehicle, and for providing a position signal indicative of the vehicle's position; and means for interfacing said decoded ID signal and said position signal and for providing data indicative of vehicle position and identity on a display to an operator.

6. The airport vehicle identification system of claim 4 wherein said ground surveillance radar further comprises:

an exciter for providing a pulsed electromagnetic signal having a certain pulse repetition factor and carrier frequency $f_c$;

an interrogation exciter for providing a pulsed electromagnetic interrogation signal having a carrier frequency $f_1$;

means for multiplexing said pulsed electromagnetic signal and said pulsed electromagnetic interrogation signal, and for transmitting a resultant multiplexed signal;

an antenna for radiating said resultant multiplexed signal, and for receiving said reflected skin return signal and said encoded ID signal;

a radar receiver for detecting and processing said reflected skin return signal to determine vehicle position and provides a position signal indicative thereof;

a beacon receiver tuned to detect and process said encoded ID signal to determine vehicle identity and provide a processed identity signal indicative thereof; and means responsive to said position signal and said processed identity signal, for interfacing'said position signal and said identity signal and for displaying to an operator display data indicative of vehicle position and identity.

7. The airport vehicle identification system of claim 6 wherein said carrier frequencies $f_c$ and $f_1$ are both in the Ku frequency band.

8. The airport vehicle identification system of claim 2 further comprising a plurality of said frequency translators.

9. An airport surface vehicle detection and identification system, comprising:

a ground surveillance radar comprising (i) a transmitter which multiplexes a pulsed electromagnetic waveform having a carrier frequency value $f_c$ and an interrogation waveform having a carrier frequency value $f_1$ and transmits the resultant multiplexed electromagnetic signal, and (ii) a receiver including a radar receiver and a beacon receiver wherein said radar receiver detects backscattered electromagnetic energy at carrier frequency $f_c$ indicative of the range of the vehicle, and said beacon receiver detects a bandshifted reply signal and processes said bandshifted reply 'signal to determine the identity of the source of said bandshifted reply signal; and a frequency translator having a first channel which includes an RF receiver for receiving said interrogation waveform and provides a received interrogation signal to a mixer which bandshifts said received interrogation signal to a carrier frequency $f_t$ compatible with the vehicle transponder and provides a bandshifted interrogation signal to an antenna which radiates said bandshifted interrogation signal to the vehicle transponder, and second channel which includes a second RF receiver which receives a reply signal from the vehicle transponder and provides a received reply signal to a mixer which bandshifts the received reply signal to a carrier signal value $f_1$ compatible with the ground surveillance radar and provides a bandshifted reply signal to an antenna which radiates said bandshifted reply signal to the ground surveillance radar.

10. The airport surface vehicle detection and identification system according to claim 9 wherein said carrier frequency values $f_c$ and $f_2$ are both within the Ku radar band.

11. The airport surface vehicle detection and identification system according to claim 10 further comprising a series of said frequency translators located in spaced relationship along the surface of an airport.

12. A bi-directional frequency translator for interfacing a ground surveillance radar and a vehicle mounted transponder, comprising means for receiving-an interrogation signal having a carrier frequency signal value $f_1$ from the ground surveillance radar;

means for bandshifting said interrogation signal to a frequency value $f_t$ compatible with the vehicle mounted transponder and for providing a bandshifted interrogation signal;

means for transmitting said bandshifted interrogation signal;

means for receiving a reply signal from the vehicle mounted transponder, means for bandshifting the reply signal to a carrier frequency signal value $f_1$ which is compatible with the ground surveillance radar system and for providing a bandshifted reply signal indicative thereof; and means for transmitting said bandshifted reply signal to the ground surveillance radar.

13. The bi-directional frequency translator of claim 12 further comprising an antenna of receiving said interrogation signal and said reply signal.

14. The bi-directional frequency translator of claim 13 wherein said means for transmitting said bandshifted interrogation signal includes an RF amplifier and an antenna.

15. The bi-directional frequency translator of claim 14 wherein said means for bandshifting includes means for generating a frequency shifting signal having a frequency value $f_s$ and a mixer which mixes said frequency shifting signal and said interrogation signal to provide said bandshifted interrogation signal.

16. A method of determining the position and identity of a vehicle equipped with a transponder operating on the surface of an airport, using a frequency translator to condition interrogation signals from a ground surveillance radar to the transponder and also to condition a reply signal from the vehicle transponder, comprising the steps of:

transmitting an interrogation signal from the ground surveillance radar system;

receiving said interrogation signal at the frequency translator;

bandshifting the received interrogation signal to a carrier signal frequency value $f_t$ compatible with the operational frequency spectrum of the transponder and providing a bandshifted interrogation signal; and transmitting said bandshifted interrogation signal from the frequency translator to the transponder.

17. The method of claim 16 further comprising the steps of:
   receiving a reply signal from the transponder at the frequency translator and providing a received reply signal indicative thereof;
   bandshifting said received reply signal to a carrier frequency signal value $f_1$ compatible with the operational frequency of the ground surveillance radar and providing a bandshifted reply signal indicative thereof; and
   transmitting said bandshifted reply signal.

* * * * *